Patented Jan. 19, 1937

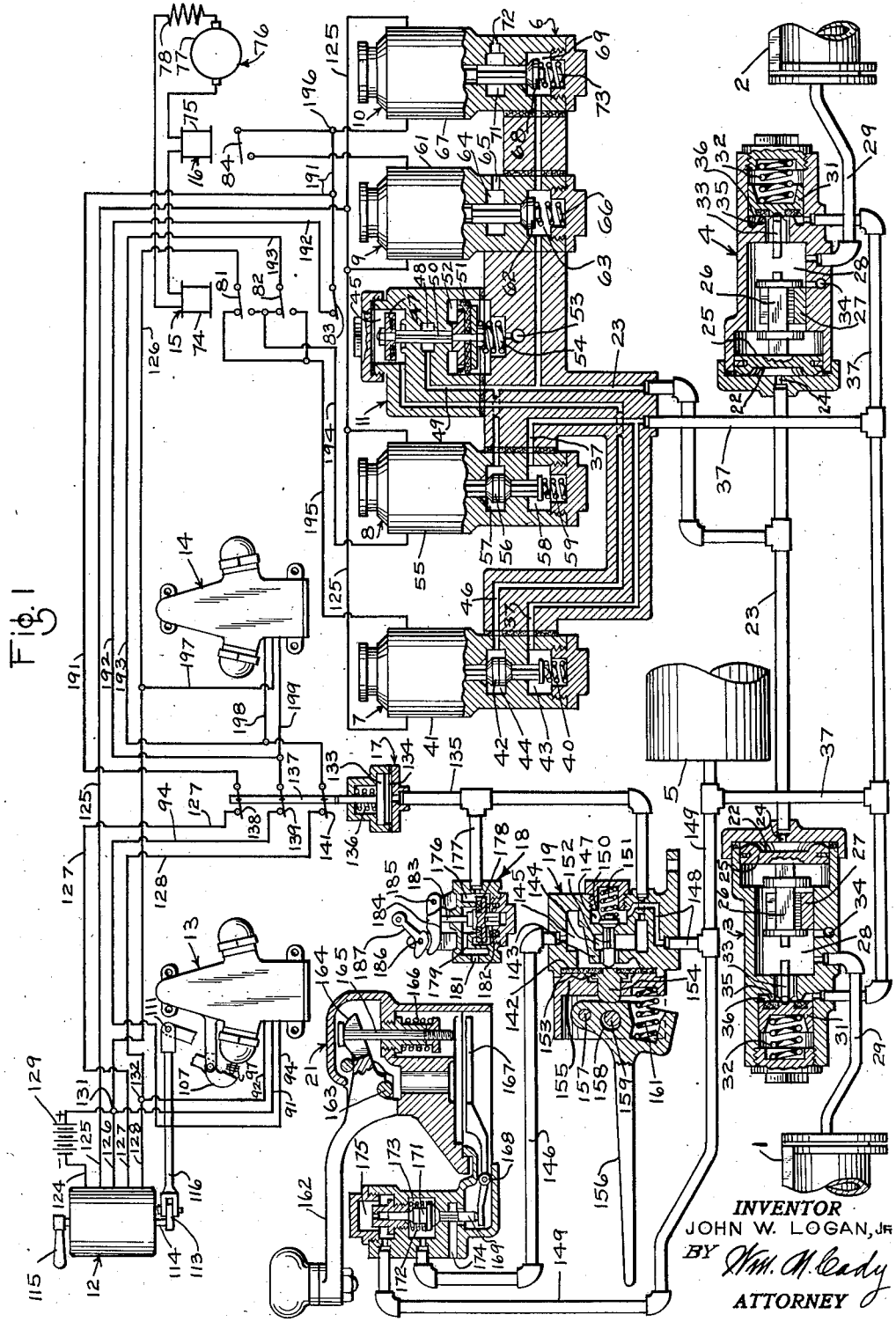

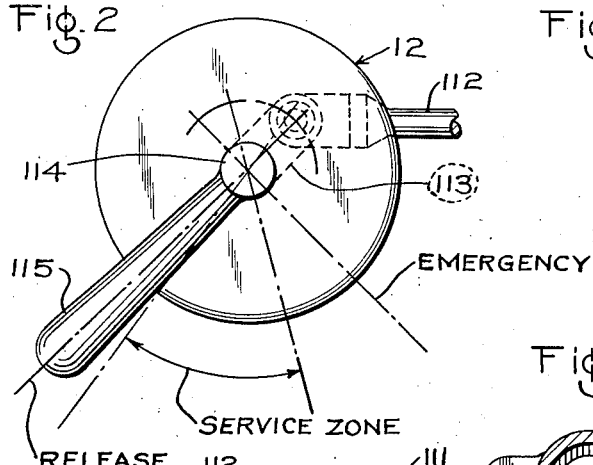
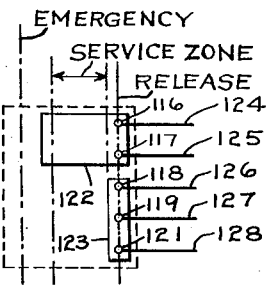
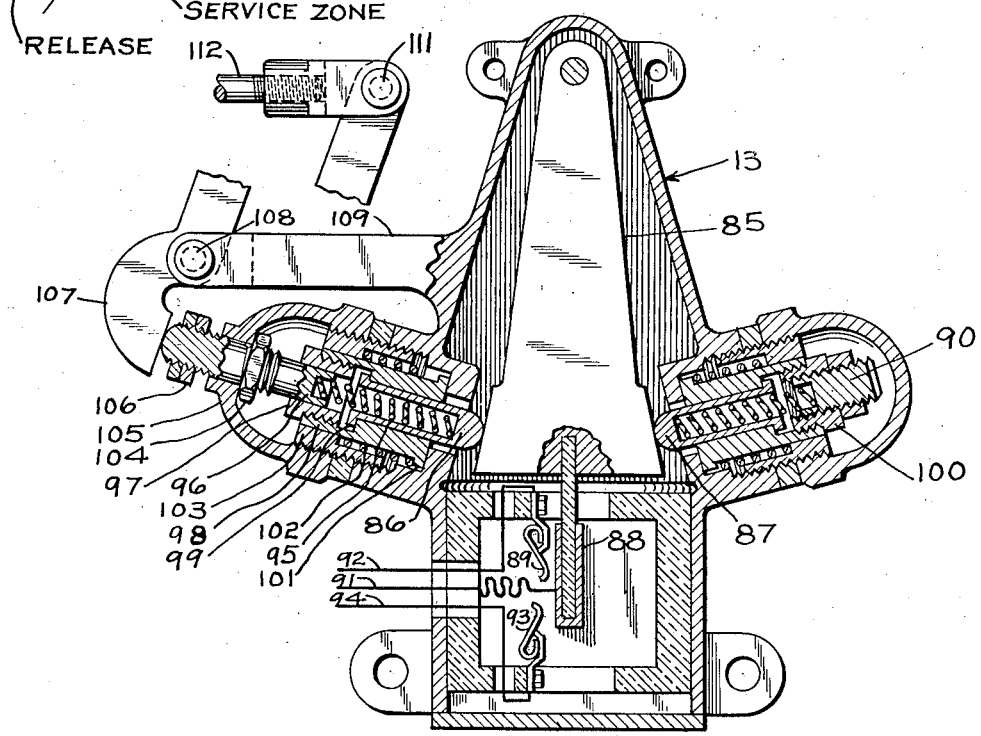

2,068,339

UNITED STATES PATENT OFFICE 2,068,339

RETARDATION CONTROLLED BRAKE

John W. Logan, Jr., Edgewood, Pa., assignor to The Westinghouse Air Brake Company, Limited, Wilmerding, Pa., a corporation of Pennsylvania Application June 22, 1934, Serial No. 731,851

36 Claims. (Cl. 303—24)

My invention relates to a retardation control system for railway vehicles and is particularly adapted for use on vehicles driven by electric motors and provided with an electropneumatic brake equipment.

In vehicles employing friction type brakes it is well known that for a given braking pressure such brakes are less effective in retarding the motion of a vehicle at high speeds than at low speeds because the coefficient of friction between the rubbing parts is lower at high speeds than at low speeds. In order to bring a vehicle to a stop quickly it has been the usual practice for an operator to apply the brakes with a high degree of braking pressure at high speeds, and, as the speed of the vehicle decreases, to cause the braking pressure to decrease at such a rate that the vehicle is brought to a stop quickly and smoothly, without dangerous shock or skidding of the wheels. It has heretofore been proposed to provide retardation control apparatus to accomplish this varying of the braking pressure automatically in accordance with a preselected rate of retardation. This apparatus may comprise an inertia responsive device, such as a pendulum, that assumes various positions in accordance with variations in the deceleration of the vehicle, and that is adapted, by means of electric circuits or otherwise, to control the degree of brake application.

If a retardation controller is provided as above described and is employed to control the operation of a valve for venting fluid under pressure from the brake cylinder, it has been found that, with a valve having a fixed orifice, and with a fixed volume to vent, the operation of the retardation controller either reduces brake cylinder pressure too much at the beginning of a stop, at which time the vehicle is traveling at a relatively high speed, or vents air too slowly at the end of the stop, when the vehicle is traveling at a relatively low speed. If the fixed discharge orifice provided in such valves is of sufficient size to permit the discharge of fluid under pressure from the brake cylinder at the maximum required rate for low vehicle speeds to prevent skidding of the car wheels on the rails, it frequently happens that too much air is vented to the atmosphere while the vehicle is traveling at higher speeds, thus releasing the brake more than the desired amount for such speeds, and requiring a reapplication of the brakes to be made to produce the desired braking force. The repeating occurrence of this phenomenon effects too great a lowering of the braking pressure followed by an increase in braking pressure, thus producing a pumping action in the operation of the brake equipment with the consequent waste of air.

One object of my invention is to provide for rapid venting of fluid under pressure from the brake cylinder at low vehicle speeds while preventing excessive venting of fluid under pressure at the higher vehicle speeds.

Another object of my invention is the provision of braking equipment having means responsive to the vehicle speed for automatically selecting and rendering effective one of a plurality of brake cylinder exhaust rates according to the speed of the vehicle.

A further object of my invention is the provision of a retardation control system in which the braking pressure is automatically controlled by a retardation controller of the inertia type while the brake control handle remains in any service position and in which the braking pressure is retained after the vehicle is stopped until the brake controlling handle is moved to its release position.

A still further object of my invention is to provide for limiting the brake cylinder pressure when the vehicle is stopped to an amount sufficient to hold the vehicle at rest without building up full cylinder pressure while permitting the operator to obtain full cylinder pressure if he so desires.

Another object of my invention is the provision of an electrically controlled brake equipment having dead man safety mechanism for interrupting the control circuits to effect full braking action independently of the position of the brake controlling handle.

Other objects and advantages of my invention will appear from the following description taken in connection with the accompanying drawings in which Fig. 1 is a diagrammatic view of circuits and apparatus illustrating one preferred embodiment of my invention, Fig. 2 is a plan view of the brake controlling switch, Fig. 3 is a schematic development of the brake switch drum, and Fig. 4 is a view in vertical section of the retardation controller.

Referring to the drawings and more particularly to Fig. 1 thereof, the fluid pressure brake apparatus there illustrated comprises brake cylinders 1 and 2, relay valve devices 3 and 4, a main reservoir 5, a control valve assembly 6 including magnet valves 7, 8, 9 and 10 and a cut-off valve 11, the operation of which is controlled by a brake switch 12, a service retardation controller 13, an emergency retardation controller 14 and relays 15 and 16. The brake apparatus also includes a safety feature which comprises a pneumatic switch 17, a conductor's valve 18, a diaphragm foot valve device 19 and a controller handle device 21.

While, in the illustrated embodiment of my invention, two brake cylinders and two relay valves are shown as controlled by one control valve assembly, such as might be desirable when two brake cylinders are employed on one car, it will be obvious that either a greater number of brake cylinders, or a single brake cylinder may be so controlled.

The relay valve device 3 comprises a casing having a chamber 22 constantly connected to the application and release pipe 23 through a restricted passage 24 and containing a piston 25 which is adapted, through the medium of a stem 26, to operate a slide valve 27 operatively connected to the stem and contained in a valve chamber 28 that is constantly connected to the brake cylinder 1 through a brake cylinder pipe 29. Also contained in the casing is a fluid pressure supply valve 31 which is subject to the pressure of a spring 32 and which is provided with a stem 33 that is adapted to be operatively engaged by the end of the piston stem 26.

The relay valve device 3 is shown in its brake releasing position in which the relay piston 25 and slide valve 27 are in their extreme right, or brake releasing positions. With the slide valve 27 in this position, the valve chamber 28, and consequently the brake cylinder 1, is connected to the atmosphere through an exhaust passage 34. With the piston 25 in release position the stem 26 will be out of engagement with the end of the supply valve stem 33 so that the pressure of the spring 32 will maintain the supply valve 31 seated against its seat rib 35 thereby maintaining communication closed from a chamber 36 that is constantly connected to the main reservoir 5 through a main reservoir pipe 37.

The relay valve device 4 for controlling the application and release of fluid under pressure to and from the brake cylinder 2 is identical in construction to the relay valve device 3 and the several parts thereof are correspondingly numbered.

The control valve assembly 6 includes an application magnet valve device 7 comprising a magnet 41 for operating a valve 42 that controls communication between an inlet chamber 43, connected to the reservoir 5 through passage and pipe 37, and the valve chamber 44 that is connected by the passage 46 to the inlet chamber 45 of the cut-off valve 11. A spring 40 is provided within the inlet chamber 43 for biasing the valve 42 upwardly to its unseated position. The cut-off valve 11 comprises a casing defining the valve chamber 45 containing a valve 47 for controlling communication between the chamber 45 and an outlet chamber 48 that is connected by passage 49 to the application and release passage and pipe 23. The valve 47 is connected by a valve stem 50 to a piston 51 in a chamber 52 in the lower part of the cut-off valve casing. The lower side of the piston 51 is in communication with the atmosphere through an exhaust passage 53, and the piston 51 and the valve 47 are normally biased to the unseated valve position by a spring 54. The control valve assembly also includes an application magnet valve device 8 comprising a magnet 55 operatively connected to a valve 56 for controlling communication between a valve chamber 57, connected to the passage and pipe 23, and an inlet chamber 58, connected to the main reservoir pipe and passage 37. A spring 59 is provided in the inlet chamber 58 for biasing the valve 56 from its seated position.

The control valve assembly 6 also includes release magnet valve devices 9 and 10, the device 9 having a magnet 61 for operating a valve 62 for controlling communication between a valve chamber 63, connected to the passage 23, and an outlet chamber 64, connected to the atmosphere through an exhaust port 65. A spring 66 is provided in the valve chamber 63 for biasing the valve 62 upwardly toward its seated position. The release magnet valve device 10 comprises a magnet 67 for operating a valve 68 for controlling communication between the valve chamber 69, connected to the passage 23, and an outlet chamber 71 connected by a restricted port 72 to the atmosphere. A spring 73 is provided in the valve chamber 69 for biasing the valve 68 upwardly toward its seated position. The exhaust port 72 of the device 10 is restricted to be smaller in cross section than the port 65 of the application magnet valve device 9, so that the release of fluid under pressure is made at a slower rate through the valve device 10 than through the valve device 9 when in their valve open positions.

The magnet valve devices 7, 8, 9 and 10 are controlled by the brake switch 12, the service retardation controller 13, the emergency retardation controller 14 and the speed responsive relays 15 and 16. The relays 15 and 16 are provided with windings 74 and 75, respectively, that are illustrated as connected in series circuit relation with each other and to a source of energy the voltage of which varies with the speed of the vehicle, such as the tachometer generator 76 having an armature winding 77 and a field winding 78. The relays 15 and 16 are shown in their energized or running positions in which the contact members 81, 82 and 83 of the relay 15 are in their upper circuit closing positions, and the contact member 84 of the relay 16 is in its upper or circuit interrupting position.

Instead of the relays 15 and 16 being energized by a tachometer generator, they may be energized in accordance with the counter electromotive force during idling periods of the motors and directly from a power circuit during periods that power is supplied to the motors. Whether energized from a separate tachometer generator or from the propulsion motor, the windings 74 and 75 of the relays 15 and 16, respectively, will remain sufficiently energized to hold their armatures, and associated contact members, in their upper positions until the speed of the vehicle has decreased to predetermined values. The relay 15 is arranged to drop its contact members 81, 82 and 83 to their lower positions when the vehicle speed decreases to a low predetermined value, say approximately 1 mile per hour, and the relay 16 is arranged so that its contact member 84 will drop to its lower or circuit closing position when the speed of the vehicle decreases to a higher predetermined value, say about 10 or 12 miles per hour. Both relays 15 and 16 will be energized by the current of the propulsion motors during starting of the vehicle. If the train starts to drift when at rest, as on a gradient, the relays 15 and 16 will become energized and actuate their contact members upwardly if the car speed increases to the speed at which the relays are adjusted to operate.

The construction of the service retardation controller 13 is best illustrated in Fig. 4 and comprises an inertia device, such as a pendulum 85, that is in engagement with spring plungers 86 and 87 and that carries a contact member 88 at its lower end that is adapted, upon a predetermined movement toward the left, to engage a fixed contact member 89 and close a circuit between conductors 91 and 92, and, upon a further movement toward the left, to engage a contact member 93 and close a circuit between conductors 91 and 94. The plunger 86 is provided with a central bore for accommodating a spring 95 that engages the lower end of the bore, the other end of which is contained within and engages the end of a bore in a slidably mounted adjusting bolt 96 that extends within a bore in a stop 97 that is screw-threadedly attached to the outer end of a sleeve 98, the lower end of which surrounds and supports the plunger 86. The plunger 86 is provided with an outwardly extending flange 99 at its outer end which engages a shoulder on the sleeve 98 to limit movement of the plunger toward the pendulum. The lower end of the sleeve 98 is provided with an outwardly extending flange 101 that engages a portion of the controller casing to limit its inward motion and to accommodate a spring 102 that is positioned about the sleeve, the lower end of which engages the outwardly extending flange 101, and the upper end of which is contained within a portion of a sleeve 103 and passes upwardly against a shoulder therein.

Upon a predetermined rate of deceleration of the vehicle the inertia of the pendulum 85 will be sufficient to move it toward the left, pressing the plunger 86 against the bias of the spring 95 until the flange 99 engages the stop 97 and the contact member 88 engages the contact member 89. The force of the spring 102 is sufficient to maintain the sleeve 98 in its illustrated position in which the sleeve flange 101 is maintained in engagement with the controller casing. Upon a predetermined greater rate in the deceleration of the vehicle, the inertia of the pendulum 85 will force the plunger 86 further toward the left causing the stop 97 and the sleeve 98 to move against the bias of the spring 102 plus the bias of spring 95 until the contact member 88 engages the contact member 93.

In order to adjust the minimum bias that may be desired on the spring 95 the adjusting bolt 96 is provided with a nut 104 that engages the inner wall of a cap nut 105, through which the bolt 96 extends. Adjusting nuts 106 are provided on the outer end of the bolt 96 to limit the amount of movement inwardly that may be permitted to correspondingly increase the bias on the spring 95. In order to adjust the pressure of the spring 95 above its minimum value a lever 107 is provided, and is mounted on a pivot pin 108 carried by a bracket 109 extending from the casing of the retardation control structure, the lower end of the lever engaging the outer end of the adjusting bolt 96. The upper end of the lever 107 is pivoted at 111 to a rod 112 that extends to a link 113 mounted on the brake switch shaft 114 and movable about its axis by the brake handle 115. If the operator moves the handle 115 toward the right as viewed in Fig. 2, the rod 112 is moved toward the left and the lower end of the lever 107 is moved toward the right an amount depending upon the degree of movement of the handle 115 away from its release position to correspondingly move the adjusting bolt 96 downwardly to increase the bias of the spring 95 and to correspondingly increase the force of the pendulum 85 required to cause engagement of the contact members 88 and 89. The position of the handle 115 within its service zone therefore determines the amount of retardation permitted before the retardation controller will be brought into operation. The further the handle is moved toward the right the greater will be the retardation required before the controller will operate to partially release the brakes.

The several parts for supporting the spring pressed plunger 87 are exactly similar to those for supporting the spring pressed plunger 86 excepting that the stop adjusting nut 90 is screw-threadedly attached to the stop 100 instead of being slidable therethrough as is the adjusting bolt 96 through the stop 97 and actuated by operation of the brake controlling handle. The emergency retardation controller 14 is similar in construction and operation to the service retardation controller 13 excepting that the tension of its several springs is permanently adjusted to correspond with the maximum obtainable in the service retardation controller.

Referring to Fig. 3, the brake switch comprises fixed contact members 116, 117, 118, 119 and 121 and movable contact drum segments 122 and 123. In the release position and in any service zone position of the brake handle 115 the contact members 116 and 117 engage the conducting segment 122 to connect the conductor 125 through conductor 124 to the negative terminal of a battery 129. In the release position of the handle 115 the contact members 118, 119 and 121 are all in engagement with the conducting segment 123, the conductors 127 and 128 being therefore connected to the positive side of the battery 129 through conductor 126 and junction point 131. The conductor 91, leading to the service retardation controller, is connected to the positive side of the battery 129 at the junction point 131, and the conductor 92, leading to the service retardation controller, is connected to the conductor 128 at the junction point 132.

Referring now to the emergency features of the equipment, the pneumatic switch 17 comprises a casing enclosing a piston 133 within a piston chamber 134 that is connected to a pipe 135 through which fluid under pressure is supplied from the reservoir 5, either through the operation of the diaphragm foot valve device 19, the controller handle device 21, or both, so that fluid under pressure is supplied to the under side of the piston 133 to force it upwardly against the bias of a spring 136. A rod 137 extends upwardly from the piston 133 and carries contact members 139, 138 and 141 which, in the upper position of the piston, are in their circuit closing positions.

The foot valve device 19 may comprise a casing having a flexible diaphragm 142 therein, one part of which is adapted to seat on a seat ring 143 formed on the casing and to act as a valve to control communication between a chamber 144, connected to the safety control pipe 135, and a chamber 145, connected to the pipe 146. The casing also has a chamber 147, constantly connected to the main reservoir 5 through the branch passage and pipe 148 and the pipe 149. A valve 150 is contained within the valve chamber 147 which is subject to the pressure of a coil spring 151 also contained within the valve chamber. The valve 150 is provided with a fluted stem 152 the outer end of which is in engagement with the side of the diaphragm that is adapted to seat on the ring seat 143.

Engaging the other side of the diaphragm 142 is a follower 153 having an operating stem 154 that is slidably mounted in a wall 155 of the casing. The outer end of this stem extends beyond the outer surface of the wall 155 and is operatively engaged by a foot pedal 156 that is pivotally supported by a pin 157 secured to the casing. Secured to the casing and extending through an opening 158 in the foot pedal is a pin 159 the opening being of greater diameter than the pin so as to permit a limited movement of the pedal. Interposed between and engaging the pedal 156 and the casing is a coil spring 161 the pressure of which tends at all times to rotate the pedal in a clockwise direction about the pin 157.

The controller handle device 21 may comprise a handle 162 fastened on the pin 163 in the controller handle train and provided with outwardly extending bifurcated fingers 164 that engage under the head of a pin 165 to move the pin upwardly as the handle 162 is pressed down, thus raising the pin 165 against the pressure of a spring 166 and bringing it out of engagement with the lever 167. The lever 167 is pivotally mounted on the pin 168 in the casing of the controller handle device, and its shorter end engages a valve stem 169 that extends upwardly to the double beat pilot valve 171 that is pressed downwardly by a spring device 172 in the valve chamber 173. When the pin 165 is raised from engagement with the lever 167 the spring 172 forces the pilot valve 171 to its lower seated position to close communication between an exhaust port 174 and the valve chamber 173, that is connected to the pipe 146, and effects communication between the valve chamber 173 and a chamber 175, that is constantly connected through pipe 149 with the main reservoir 5.

With the controller handle 162 of the controller handle device 21 in its depressed or illustrated position, and the pedal 156 of the diaphragm foot valve device 19 in its release or illustrated position, air under pressure will pass from the reservoir 5 through pipe 149 and chambers 173 and 175 of the controller handle device to the pipe 146 leading to the chamber 145 in the diaphragm foot device 19, past the diaphragm 142 to the chamber 144 and to the pipe 135, forcing the piston 133 of the pneumatic switch upwardly.

If the operator should relieve the handle 162 of the controller handle device of pressure, the spring 166 will force the pin 165 downwardly against the end of the lever 167 raising the pilot valve 171 to release fluid under pressure from the chamber 134 of the pneumatic switch through the diaphragm foot valve device 19 and to the port 174. The piston 133 will therefore be moved downwardly by the spring 136, moving the switch contact members 138, 139 and 141 to their circuit interrupting positions, and effecting application of brakes in a manner to be later described. If, prior to releasing the handle 162 the operator presses downwardly upon the pedal 156 of the diaphragm foot valve device, the diaphragm 142 will be pressed toward its ring seat 143 closing communication between the chambers 145 and 144, and opening communication, by operating the valve 150 toward the right, between the chamber 147, that is permanently connected to the main reservoir 5, and the chamber 144, thus maintaining pressure in the pipe 135 upon release of the control handle 162 which now is effective to release fluid under pressure only from the pipe 146 and chamber 145 of the diaphragm foot valve device 19. It will be apparent, therefore, that if pressure is exerted downwardly either upon the control handle 162 or the foot pedal 156 fluid under pressure will not be vented from the piston chamber 134 of the pneumatic switch 17, but, should pressure be relieved both from the control handle 162 and the pedal 156, fluid under pressure will be so vented, causing the switch 17 to be operated to its circuit interrupting position.

The conductor's valve 18 may comprise a casing containing a chamber 176 that is constantly connected through branch pipe 177 and a portion of the pipe 135 to the piston chamber 134 of the pneumatic valve device. A valve 178 is also contained within the casing for controlling communication between the chamber 176 and a chamber 179 that is connected through the exhaust port 181 to the atmosphere. The valve 178 is normally biased upwardly to its seated position by a spring 182 thus closing communication between the chambers 176 and 179. A valve stem 183 extends upwardly from the valve 178 and engages a valve lever 184 pivoted on a pin 185, mounted on the valve casing. An operating lever 187 is pivotally mounted upon a pin 186 carried on a bracket extending from the valve casing, and which, when moved in either direction, forces the valve lever 184 downwardly, unseating the valve 178 and permitting fluid under pressure to be vented through the port 181 from the chamber 134 of the pneumatic pressure switch 17, thus causing the switch to operate to its circuit interrupting position.

It will be noted that upon the closing of the pneumatic switch 17 the several conductors 127, 94, and 128 are respectively connected to the conductors 191, 192 and 193. The conductor 125, which is connected to the negative terminal of the battery 129 in release position of the brake switch 12, or when the handle 115 is in any position within its service zone, serves as a common return conductor for the several magnet windings of the magnet valves 7, 8, 9 and 10. It will also be noted that the conductor 191 controls the operation of the release magnet valve device 10, and also of the release magnet valve device 9 when the relay 16 is in its deenergized position. The conductor 191 is made alive through segment 123 of the brake switch when the handle 115 is in release position, and also through the lower contact member 83 of the relay 15 when the handle 115 is in service position and the conductor 192 is made alive through engagement of contact members 88 and 93 of the retardation controller. The application magnet valve devices 7 and 8 are controlled through conductors 193 and 126 in accordance with the operation of the relay 15, which functions to keep the magnet valve device 7 energized when the relay 15 is energized and the magnet valve device 8 energized when the relay 15 is deenergized, regardless of other conditions of the system except that, when the brake handle 115 is in emergency position all of the magnet valves are deenergized.

Referring further to the operation of the equipment let it be assumed that the car is standing at rest, in which condition the several circuits controlled by the service retardation controller 13 and the emergency retardation controller 14 are all interrupted, the brake handle 115 is in any position in its service application zone, the pneumatic switch 17 is in its circuit closing position, and the relays 15 and 16 are both deenergized, their movable contact members being in their lower positions. Under these conditions the winding of the application magnet valve device 8 is energized by a circuit extending from the positive terminal of the battery 129 through conductor 126 to the contact member 81 of the relay 15 in its lower position through conductor 194, the winding of the magnet 55, conductor 125, the contact member 122 of the brake switch 12, and conductor 124 to the negative terminal of the battery 129. The release magnet valve devices 9 and 10 are both deenergized and effect open communication therethrough, since the circuit through conductor 192, necessary to energize them when the brake switch 12 is positioned in its service zone, is interrupted at the contact member 83 of the relay 15, which is in its lower or circuit interupting position. The energizing circuit through conductors 127 and 191 was interrupted at the segment 123 when the switch 12 was moved from its release position. Under the assumed conditions the magnet 41 of the application magnet valve device 7 is deenergized and effects open communication therethrough. The energizing circuit of the magnet 41 may be completed through the conductor 195 and one of the contact members 81 or 82 of the relay 15. Since the relay 15 is now deenergized, the contact member 81 is in its lower position interrupting the circuit between the conductors 195 and 126, and the contact member 82 connects the conductor 195 to the conductor 193 that is connected through contact member 141, of the pneumatic switch 17, and conductor 128 to the brake switch 12, but is interrupted at this point when the handle 115 is in other than release position. The valve 42 is therefore in its upper position effecting communication between the chamber 43, that is in constant communication with the main reservoir 5, and the chamber 44, through which fluid under pressure passes to the chamber 45 of the cut-off valve 11 and through chamber 48, passage and pipe 23, to the relay valves 3 and 4 effecting application of the brakes. The supply of fluid under pressure passing through the cut-off valve 11 is interrupted when the pressure reaches some predetermined value, for example, 20 pounds, necessary to move the piston 51 downwardly bringing the valve 47 to its seat.

Fluid under pressure thus supplied to the pipe 23 flows through the restricted passage 24 to the relay piston chamber 22 causing the relay piston 25 of the relay valve device 3 to move toward the left carrying the slide valve 27 with it. The piston 25 and slide valve 27 of the relay valve device 4 will of course be moved toward the right. As the relay pistons and valves are thus operated, each slide valve laps the release port 34 closing communication from the relay slide valve chamber 28 to the atmosphere. After the port 34 is lapped the end of the piston stem 26 engages the stem 33 of the supply valve 31 and causes this valve to be unseated from its seat ring 35 against the pressure of the spring 32. With the supply valve 31 unseated, fluid under pressure is supplied from the main reservoir 5 through the main reservoir pipe 37, chamber 36, past the unseated valve 31, through valve chamber 28 and pipe 29 to the brake cylinder.

With the relay piston and valve in this position a force is exerted to move the piston 25 and valve 27 away from the supply valve 31 that consists of the pressure within the valve chamber 28 plus the pressure of the spring 32. When the pressure in the chamber 28 builds up to substantially the pressure on the face of the piston 25, as supplied through the application and release pipe 23, the piston is moved away from the supply valve 31 sufficiently to permit it to seat and cut off communication between the main reservoir 5 and the brake cylinder. When the supply valve 31 seats, the spring 32 no longer touches against the piston stem 26 so that the piston 25 and valve 27 do not move further or sufficiently to unlap the release port 34. Fluid under pressure is therefore retained in the valve chambers 28 and in the brake cylinders 1 and 2 that is substantially equal to the pressure in the application and release pipe 23.

If the operator wishes to release the brakes the brake handle 115 is moved to release position thus connecting the conductors 127 and 128 through segment 123 and conductor 126 to the positive terminal of the battery 129. The magnet 41 is thus energized to operate the valve 42 to its seat to cut off communication between the chamber 43, connected to the main reservoir 5, and the valve chamber 44 connected to the application and release pipe 23. The circuit through the magnet 41 extends from the positive terminal of the battery 129 through junction point 131, conductor 126, segment 123 of the brake switch, conductor 128, contact member 141 of the pneumatic switch 17, conductor 193, contact member 82 of the relay 15 in its lower position, conductor 195 to the winding of the magnet 41, conductor 125 to the contact segment 122 of the brake switch, and conductor 124 to the negative terminal of the battery 129. The magnet 55 of the application magnet valve device 8 remains energized through the circuit above traced which extends through the contact member 81 of the relay 15 in its lower position. The valve 56 therefore remains seated cutting off communication between the chamber 58, that is connected to the supply reservoir 5, and the valve chamber 57 that is connected to the application and release pipe 23.

In the release position of the brake handle 115, the magnets of both the release magnet valve devices 9 and 10 become energized, operating the valves 62 and 68 downwardly effecting communication between the valve chamber 63 and the exhaust port 65, and between the valve chamber 69 and the exhaust port 72, thus releasing fluid under pressure from the application and release pipe 23 to the atmosphere. These circuits extend from the positive terminal of the battery 129 through junction point 131, conductor 126, contact member 123 of the brake switch, conductor 127, the upper contact member 138 of the pneumatic switch 17, conductor 191 to the junction point 196 at which point the circuit divides, one branch extending through the winding of the magnet 67 of the application magnet valve 10 to the conductor 125, and the other branch extending through the contact member 84 of the relay 16, in its lower or closed position, through the winding of the magnet 61 of the application release magnet valve device 9 to the conductor 125, where the circuits again join and extend to the contact segment 122 of the brake switch, and through conductor 124 to the negative terminal of the battery 129.

If the train is now put in motion, current to the starting motor 76 will energize the relays 15 and 16 causing them to operate their contact members upwardly and, as the train eventually attains a speed higher than values corresponding to the setting of the relays, that is about one mile per hour for the relay 15, and 10 or 12 miles per hour for the relay 16, the relays will remain energized while the train is drifting.

Upon energization of the relay 15 the contact members 81, 82 and 83 thereof are actuated to their upper or illustrated positions, thus interchanging the circuits to the windings of the application magnet valve devices 7 and 8 through the contact members 81 and 82 of the relay 15, the magnet 41 of the device 7 being now energized through the contact member 81 and conductor 126, and the magnet 55 of the device 8 being now energized through the contact member 82 and the conductor 193. The relay 15 operates at a sufficient rate of speed during this transition so that the magnets 41 and 55 remain energized during the transition. Upon energization of the relay 16 the contact member 84 thereof is actuated upwardly, interrupting the circuit through the magnet winding 61 of the release magnet valve device 9, and permitting the valve 62 to be actuated to its seated position by the spring 66. The magnet 67 of the release magnet valve device 10 remains energized holding the valve 68 in its open position.

If the operator wishes to apply the brakes the handle 115 is moved from release position to any position in its service application zone to correspondingly adjust the pressure on the spring 95 of the service retardation controller, the particular position of the brake handle determining the position of the lever 107 and of the adjusting bolt 96 of the controller. Movement of the brake switch from its release position interrupts the connection between the conductors 127 and 128, through contact segment 123 and conductor 126, to the positive terminal of the battery 129. Interruption of the above traced circuit, through the conductor 128 for energizing the winding of the magnet 55 of the application magnet valve device 8, causes the valve 56 to be operated upwardly by the spring 59, thus effecting communication between the main reservoir 5 and the application and release pipe 23 to operate the relay valve devices 3 and 4 to cause immediate building up of pressure in the brake cylinders 1 and 2. Interruption of the circuit through conductor 127 for energizing the winding of the magnet 67 of the release magnet valve device 10 causes the valve 68 to be moved upwardly by the spring 73, cutting off communication from the application and release pipe 23 to the atmosphere to retain pressure in the piston chambers of the relay valve devices. The winding of the magnet 41 of the application magnet valve device 7 remains energized through the contact 81 of the relay 15 and the winding of the magnet 61 of the release magnet valve device 9 remains interrupted through the contact member 84 of the relay 16.

When the retardation of a vehicle from the application of the brakes becomes sufficient to cause the pendulum 85 of the service retardation controller 13 to move forward sufficiently to press the plunger 86 against the stop 97 against the bias of the spring 95 and cause engagement of the contact member 88 with the contact member 89, a circuit is completed from the positive terminal of the battery 129 through conductor 91, contact members 88 and 89 and conductor 92 to the conductor 128 at junction point 132, and from that point through the above traced circuit energizing the winding of the magnet 55 to operate the valve 56 of the application magnet valve device 8 to close communication from the reservoir 5 to the application and release pipe 23 thus preventing further increase of brake cylinder pressure. If the resulting retardation of the vehicle becomes sufficient to cause the pendulum 35 to be pressed forward with sufficient force to move the stop 97 and the sleeve 93 against the bias of the spring 102, thus causing engagement of the contact member 88 with the contact member 93, a circuit will be completed from the positive terminal of the battery 129 through conductor 91, contact members 88, 93, conductor 94, contact member 139 of the pneumatic switch 17, conductor 192, contact member 83 of the relay 15, conductor 191 and the winding of the magnet 67 of the release magnet valve device 10 to the conductor 125, and back to the negative terminal of the battery 129 as above traced, thus operating the valve 68 to its open position and effecting release of fluid under pressure from the application and release pipe 23 through the restricted port 72 to the atmosphere. The brakes will accordingly be released until the rate of retardation of the vehicle is decreased sufficiently that the pendulum 85 moves the contact member 88 out of engagement with the contact member 93 permitting closing of the valve 68. So long as the speed of the vehicle is above the amount at which the relay 16 is deenergized to drop its contact 84, the release of the brakes will be effected by releasing fluid under pressure from the application and release pipe and the relay valves through the restricted port 72 of the release magnet valve device 10. When the speed of the vehicle is decreased to the amount at which the relay 16 is deenergized, say 10 or 12 miles per hour, the contact member 84 drops to its circuit closing position and further operation of the service retardation controller to effect engagement of the contact members 88 and 93 thereof will energize the winding of the magnet 61 of the device 9 as well as the magnet 67 of the device 10, thus operating the valve 62 downwardly to more rapidly release fluid under pressure from the pipe 23 through the large port 65. When the speed of the vehicle is decreased to the point, say 1 mile per hour, at which the relay 15 is deenergized, the contact members 81, 82 and 83 thereof are moved to their lower positions thus again establishing the circuit above described when the car was at rest.

If the operator desires to make an emergency application of the brakes, the handle 115 is moved to its emergency position, thus separating the conducting segments 122 from the contact members 116 and 117 and interrupting the connection between conductor 125 and the negative terminal of the battery 129. Since the conductor 125 is the negative return wire from all of the magnet valve devices 7, 8, 9 and 10, the magnet windings of each of these devices are deenergized, thus permitting full brake cylinder pressure.

As pointed out above, if the vehicle is standing at rest and the brake handle 115 is in any service position, the relay 15 being deenergized, fluid under pressure is supplied to the application and release pipe 23 from the reservoir 5 through the application magnet valve device 7 and the cut-off valve 11 to a pressure depending upon the setting of the cut-off valve. Should the train be standing on a gradient such that this pressure might be insufficient to hold the vehicle, the operator by moving the handle 115 to emergency position may effect full brake cylinder pressure. Should the train be standing on a gradient with the brake handle 115 in any service position to apply the brakes to an amount depending upon the setting of the cut-off valve 11, and should this pressure not be sufficient to maintain the vehicle at rest, a relatively slow movement of the vehicle, say 1 mile per hour, will be sufficient to energize the relay 15 as the train starts to drift, thus automatically operating the relay 15 to deenergize the magnet 55 of the application magnet valve device 8, permitting the valve 56 to be forced upwardly and apply full reservoir pressure to the application and release pipe 23 thus effecting a full application of the brakes.

If, while the train is in operation, fluid under pressure is released from the piston chamber 134 and pipe 135 of the pneumatic switch 17, either by operation of the conductor's valve 18, or by simultaneously relieving pressure from the handle 162 of the controller handle valve device 21 and from the pedal 156 of the diaphragm foot valve device 19, the pneumatic switch will be operated to its circuit interrupting position, the contact members 138, 139 and 141 being moved downwardly. The contact member 138 interrupts the circuit through the conductors 127 and 191 to the magnet 67 of the magnet valve device 10, and, if the relay 16 is deenergized, also through the contact member 84 thereof and the magnet 61 of the release magnet valve device 9, permitting both release magnet valves to close. The contact member 139 interrupts a circuit through conductor 94, the service retardation controller, through conductor 192, and contact member 83 of the relay 15 to conductor 191, thus preventing the service retardation controller from energizing the windings of either of the release magnet application valves 9 or 10. The contact member 141 interrupts the circuit through conductor 193, contact member 82 of the relay 15 and conductor 194 to the magnet 55 of the application magnet valve device 8 thus permitting the valve 56 to be moved upwardly by the spring 59 and effect communication between the reservoir 5 and the application and release pipe 23 to apply the brakes.

With the pneumatic switch 17 in circuit interrupting position, the service retardation controller 13 is no longer effective to control the degree of application of the brakes. This function is now performed by the emergency retardation controller 14 that is similar in construction and operation to the service retardation controller 13, excepting that its springs are permanently adjusted to correspond with the maximum obtainable pressure of the springs in the service retardation controller 13 and are not varied by operation of the brake switch. As the vehicle is retarded the pendulum of the retardation controller 14 swings forward causing a connection to be made between conductor 197, that is connected by conductor 126 to the positive terminal of the battery 129, through conductor 198, conductor 193, contact member 82 of the relay 15, conductor 194, the magnet winding 55 of the application magnet valve device 8, and by conductor 125 back to the negative terminal of the battery 129 to operate the valve 56 to its seat, thus closing communication between the reservoir 5 and the application and release pipe 23. Should the rate of retardation of the vehicle be sufficient to cause the emergency retardation controller 14 to close contacts between conductors 197 and 199, a circuit will be completed through conductor 192, contact member 83 of the relay 15, conductor 191, the magnet 67, and conductor 125 to the negative terminal of the battery 129, thus operating the valve 68 to effect communication between the pipe 23 and the atmosphere through restricted port 72 to release the brakes.

While I have illustrated and described one preferred embodiment of my invention it will be apparent to those skilled in the art that many modifications thereof may be made within the spirit of my invention and I do not wish it to be limited otherwise than by the scope of the appended claims.

Having now described my invention, what I claim as new and desire to secure by Letters Patent, is:

1. In a fluid pressure brake, in combination, a brake cylinder, valve means for controlling the supply of fluid under pressure to said brake, a plurality of valve means for controlling the release of fluid under pressure from said brake cylinder, manually operable means for controlling the operation of the brake, a retardation controller effective when the manually operable means is in its service application zone for automatically controlling said several valve means, and means responsive to the speed of the vehicle for selectively rendering one of said release controlling valve means operable or inoperable.

2. In a fluid pressure brake, in combination, a brake cylinder, valve means for controlling the supply of fluid under pressure to said brake cylinder, valve means having a restricted release port for controlling the release of fluid under pressure from said brake cylinder, valve means having a release port of greater flow area for controlling the release of fluid under pressure from said brake cylinder, manually operable means for controlling the operation of the several valve means, and means for automatically preventing the operation of said last named valve means to release fluid under pressure when the speed of the vehicle is above a predetermined rate.

3. In a fluid pressure brake, in combination, a brake cylinder, valve means for controlling the supply of fluid under pressure to said brake cylinder, valve means having a restricted release port for controlling the release of fluid under pressure from said brake cylinder, valve means having release port of greater flow area for controlling the release of fluid under pressure from said brake cylinder, manually operable means for controlling the operation of said valve, a retardation controller effective when said manually operable means is positioned in a service application zone for automatically controlling the degree of application of said brakes, and means for automatically interrupting the operation of said last named valve means to release fluid under pressure when the speed of the vehicle is above a predetermined rate.

4. In a fluid pressure brake, in combination, a brake cylinder, a magnet valve device for controlling the supply of fluid under pressure to said brake cylinder, a magnet valve device controlling the release of fluid under pressure from said brake cylinder at a slow rate, a magnet valve device for controlling the release of fluid under pressure from said brake cylinder at a more rapid rate, manually operable means having an operating zone in which the brakes are applied to effect a service application of the brakes, a retardation controller effective when the manually operable means is positioned in a service application zone for automatically controlling circuits for so actuating said magnet valve devices as to maintain a predetermined rate of deceleration of the vehicle, and relay means responsive above a predetermined vehicle speed to prevent operation by said retardation controller of said magnet valve device for controlling the release of fluid under pressure at the more rapid rate.

5. In a fluid pressure brake, in combination, a brake cylinder, valve means for controlling the supply of fluid under pressure to said brake cylinder, valve means for controlling the release of fluid under pressure from said brake cylinder having a restricted release port and a release port of greater flow area, manually operable means for controlling the operation of said valve means, and means for automatically preventing the release of fluid under pressure through said port of greater flow area when the speed of the vehicle is above a predetermined amount.

6. In a fluid pressure brake, in combination, a brake cylinder, valve means for controlling the supply of fluid under pressure to said brake cylinder, valve means for controlling the release of fluid under pressure from said brake cylinder at a slow rate or at a more rapid rate, manually operable means for controlling the operation of said valve means, a retardation controller effective when the manually operable means is positioned in a service application zone for automatically controlling said valve means, and means for automatically preventing the operation of said valve means to effect the release of fluid under pressure at the more rapid rate when the speed of the vehicle is above a predetermined amount.

7. In a fluid pressure brake, in combination, a brake cylinder, valve means for controlling the supply of fluid under pressure to said brake cylinder, valve means for controlling the release of fluid under pressure from said brake cylinder, manually operable means for controlling the operation of said valve means, an inertia type retardation controller effective when the manually operable means is positioned in a service application zone for automatically controlling said valve means to effect a selected rate of retardation of the vehicle, and means effective when said vehicle is at rest for interrupting the controlling relation between the retardation controller and the said valve means to prevent further release of fluid under pressure from said brake cylinder until said manually operable means is in its release position.

8. In a fluid pressure brake, in combination, a brake cylinder, a magnet valve application device for controlling the supply of fluid under pressure to said brake cylinder, a magnet valve release device for controlling the release of fluid under pressure from said brake cylinder, electric circuits for energizing said magnet valve devices for actuating them to their valve opening positions, manually operable means for controlling said circuits for applying and releasing said brakes, an inertia type retardation controller effective when the manually operable means is positioned in a service zone for automatically controlling said circuits to effect a controlled rate of retardation of the vehicle, and relay means effective when said vehicle is at rest for preventing operation of said release magnet valve to release fluid under pressure from said brake cylinder until said manually operable means is returned to its release position.

9. In a fluid pressure brake, in combination, a brake cylinder, an application magnet valve device for controlling the supply of fluid under pressure to said brake cylinder, a release magnet valve device for controlling the release of fluid under pressure from said brake cylinder, electric contacts for energizing said magnet valve devices for operating them to their valve opening positions, manually operable means for controlling the energization of said circuits to effect the application and release of said brake, an inertia type retardation controller effective when the manually operable means is positioned in a service zone for controlling said circuits to maintain a selected rate of retardation of the vehicle, and relay means operative upon a predetermined low vehicle speed for interrupting the energization of the release magnet valve device to prevent further release of pressure from the brake cylinder until the manually operable device is returned to its release position.

10. In a fluid pressure brake, in combination, a brake cylinder, an application magnet valve device for controlling the flow of fluid under pressure to said brake cylinder and being effective to interrupt such flow when energized, a release magnet valve device for controlling the flow of fluid under pressure from said brake cylinder, and being effective to interrupt such flow when deenergized, a manually operable brake switch for effecting energization of said magnet valve devices to release the brake and for effecting the deenergization of said magnet valve devices to apply the brake, an inertia retardation controller responsive to the rate of retardation of the vehicle and effective when the brake switch is positioned in a service zone for effecting the energization of said magnet valve devices to limit the braking pressure, and relay means operative upon a predetermined low vehicle speed for interrupting the energization of the release magnet valve device to prevent further release of pressure from the brake cylinder until the manually operable brake switch is returned to its release position.

11. In a fluid pressure brake, in combination, a brake cylinder, an application magnet valve device effective when deenergized to establish communication between a source of fluid under pressure and said brake cylinder and effective when energized to close such communication, a release application valve device effective when energized to establish communication between said brake cylinder and the atmosphere and effective when deenergized to close such communications, a manually operable brake switch for effecting energization of said magnet valve devices to release the brake and for effecting the deenergization of said magnet valve devices to apply the brake, an inertia type retardation controller responsive to the rate of retardation of the vehicle and effective when the brake switch is positioned in a service zone for interrupting the energization of said magnet valve devices to limit the braking pressure, biasing means for opposing the movement of said inertia device and means actuated upon movement of said manually operable brake switch for adjusting the pressure of said biasing means to select a desired rate of retardation of the vehicle, and relay means operated upon a predetermined low vehicle speed for interrupting the energization of the release magnet valve device to prevent further release of pressure from the brake cylinder until the brake switch is returned to its release position.

12. In a fluid pressure brake for vehicles, in combination, a brake cylinder, manually operable means for controlling the application and release of the brake, valve means for controlling the supply of fluid under pressure to said brake cylinder to effect a partial brake cylinder pressure only, valve means for controlling the supply of fluid under pressure to said brake cylinder to effect full brake cylinder pressure, and means responsive to a condition of the vehicle for automatically selecting which of said valve means is effective to control brake cylinder pressure upon movement of said manually operable means to a brake applying position.

13. In a fluid pressure brake for vehicles, in combination, a brake cylinder, manually operable means for controlling the application and release of the brake, valve means for controlling the supply of fluid under pressure to said brake cylinder to effect a partial brake cylinder pressure only, valve means for controlling the supply of fluid under pressure to said brake cylinder to effect full brake cylinder pressure, means for operatively connecting said first named valve means to be operated to a brake applying position upon movement of said manually operable means to a position within a service zone when the vehicle is at rest and for operatively connecting said second named valve means to be operated to a brake applying position upon movement of said manually operable means to a position within a service zone when the vehicle is in motion.

14. In a fluid pressure brake for vehicles, in combination, a brake cylinder, manually operable means for controlling the application and release of the brake, valve means for controlling the supply of fluid under pressure to said brake cylinder to effect a partial brake cylinder pressure only, valve means for controlling the supply of fluid under pressure to said brake cylinder to effect full brake cylinder pressure, means for operatively connecting said first named valve means to be operated to a brake applying position upon movement of said manually operable means to a position within a service application zone when the vehicle is at rest and for automatically disconnecting said first named valve means and for operatively connecting said second named valve means to be actuated to a brake applying position should the vehicle start from a position of rest while the manually operable means is positioned in a service application zone.

15. In a fluid pressure brake for vehicles, in combination, a brake cylinder, valve means for effecting a partial brake cylinder pressure, valve means for effecting a full brake cylinder pressure, valve means for effecting a release of the brake cylinder pressure, manually operable means for controlling the application and release of the brakes, means for effecting operation of said first named valve means to permit the flow of fluid under pressure to said brake cylinder upon operation of said manually operable means to a position within a service zone when the vehicle is at rest and for effecting operation of said second named valve means to permit the flow of fluid under pressure to said brake cylinder upon operation of said manually operable means to a position within a service zone when the vehicle is in motion.

16. In a fluid pressure brake for vehicles, in combination, a brake cylinder, valve means for effecting a partial brake cylinder pressure, valve means for effecting a full brake cylinder pressure, valve means for effecting a release of the brake cylinder pressure, manually operable means for controlling the application and release of the brake, means for effecting operation of said first named valve means to permit the flow of fluid under pressure to said brake cylinder upon operation of said manually operable means to a position within a service zone when the vehicle is at rest and for automatically reversing the positions of said first and second named valve means upon starting of the vehicle while the manually operable means is positioned within the service zone.

17. In a fluid pressure brake for vehicles, in combination, a brake cylinder, electrically operated valve means for effecting partial brake cylinder pressure, electrically operated valve means for effecting a full brake cylinder pressure, electrically operated valve means for effecting the release of fluid under pressure from said brake cylinder, a manually operable brake switch for controlling the operation of said several electrically operated valves, and means effective when the vehicle is at rest for operatively connecting said first named valve means to said brake switch and disconnecting said second named valve means therefrom when said vehicle is at rest, and for disconnecting said first named valve means from said brake switch and connecting said second named valve means thereto when said vehicle is in motion.

18. In a fluid pressure brake, in combination, a brake cylinder, electrically operated valve means for controlling the supply of fluid under pressure to said brake cylinder, electrically operated valve means for controlling the release of fluid under pressure from said brake cylinder, a manually operable brake switch for controlling the operation of said several valves, a pressure responsive pneumatic switch connected between said brake switch and said several valves for effecting operation of said several valves to apply the brakes independently of the position of said brake switch, and manually operable means for venting fluid under pressure from said pneumatic switch.

19. In a fluid pressure brake, in combination, a brake cylinder, electrically operated valve means for controlling the supply of fluid under pressure to said brake cylinder, electrically operated valve means for controlling the release of fluid under pressure from said brake cylinder, a manually operable brake switch for controlling the operation of said several valves, a retardation controller effective when the manually operable means is positioned in a service zone for automatically controlling said valve means, a pressure responsive pneumatic switch connected between said brake switch and said several valves for effecting operation of said valves to apply the brakes independently of the position of said brake switch and of said retardation controller, manually operable means for venting fluid under pressure from said pneumatic switch, and a second retardation controller effective to control a maximum rate of retardation of the vehicle after release of fluid under pressure from said pneumatic switch.

20. In a fluid pressure brake, in combination, a brake cylinder, electrically operated valve means for controlling the supply of fluid under pressure to said brake cylinder, electrically operated valve means for controlling the release of fluid under pressure from said brake cylinder, a manually operable brake switch for controlling the operation of said several valves, a pressure operated circuit maintaining switch connected between said brake switch and said several valves for effecting operation of said several valves to apply the brakes independently of the position of said brake switch, and manually valve means for effecting the operation of said circuit maintaining switch.

21. In a safety car control equipment, in combination, a brake cylinder, electrically operated valve means for controlling the supply of fluid under pressure to said brake cylinder, electrically operated valve means for controlling the release of fluid under pressure from said brake cylinder, a manually operable brake switch for controlling the operation of said several valves, a circuit maintaining switch connected between said brake switch and said several valves for effecting operation of said several valves to apply the brakes independently of the position of said brake switch, a foot device subject to foot pressure and a device subject to hand pressure for normally maintaining said circuit maintaining switch in its circuit closing position and operative upon the release of foot pressure and of hand pressure from said foot and hand devices, respectively, for effecting operation of said switch to its circuit interrupting position.

22. In a safety car control equipment, in combination, a brake cylinder, electrically operated valve means for controlling the supply of fluid under pressure to said brake cylinder, electrically operated valve means for controlling the release of fluid under pressure from said brake cylinder, a manually operable brake switch for controlling the operation of said several valves, a circuit maintaining switch connected between said brake switch and said several valves for effecting operation of said several valves to apply the brakes to full braking pressure independently of the position of said brake switch, a controller handle and means associated therewith for effecting operation of said circuit maintaining switch to interrupt said circuit and apply the brakes.

23. In a safety car control equipment, in combination, a brake cylinder, electrically operated valve means for controlling the supply of fluid under pressure to said brake cylinder, electrically operated valve means for controlling the release of fluid under pressure from said brake cylinder, a manually operable brake switch for controlling the operation of said several valves, a pressure operated circuit maintaining switch connected between said brake switch and said several valves for effecting operation of said several valves to apply the brakes to full braking pressure independently of the position of said brake switch, and a foot actuated valve device subject to foot pressure and effective when said pressure is released to effect the release of fluid under pressure to operate said circuit maintaining switch to its circuit interrupting position to effect an application of the brakes.

24. In an electrically controlled brake equipment, electrically operated means for controlling the application and release of the brakes, a manually operated brake switch for controlling the operation of said electrically operated means, a circuit maintaining switch connected between said brake switch and said electrically operated means for effecting operation of said electrically operated means to apply the brakes, pressure responsive means for normally maintaining said switch in its circuit closing position and manually operable valve means remote from said brake switch for controlling the operation of said circuit maintaining switch.

25. In a fluid pressure brake, in combination, a brake cylinder, electrically operated valve means for controlling the supply of fluid under pressure to said brake cylinder, electrically operated valve means for controlling the release of fluid under pressure from said brake cylinder, means for controlling said electrically operated valve means comprising electric circuits and a manually operable brake switch for controlling the energization thereof, a retardation controller effective when the manually operable brake switch is positioned in a service zone for automatically closing circuits in shunt relation to those through said brake switch upon predetermined rate of retardation of the vehicle to limit the rate of deceleration thereof.

26. In a fluid pressure brake equipment, the combination with a brake cylinder, of means controlled according to the rate of retardation of the vehicle for releasing fluid under pressure from the brake cylinder, and means controlled according to the speed of the vehicle for varying the rate at which fluid is released from the brake cylinder by the retardation controlled means.

27. In a brake equipment for vehicles, in combination, braking means, means for releasing said braking means to limit the rate of deceleration of the vehicle, and means for varying the rate of making said release in accordance with variations in the speed of the vehicle.

28. In a brake equipment for vehicles, in combination, braking means, means for releasing said braking means to limit the rate of deceleration of the vehicle, and means for predetermining the rate of making the particular release in dependence upon the speed of the vehicle.

29. In a brake equipment for vehicles, in combination, braking means, means for releasing said braking means to limit the rate of deceleration of the vehicle, and means for predetermining the rate of making a particular release in dependence upon the speed of the vehicle to permit a more rapid release at a lower speed than at a higher vehicle speed.

30. In a brake equipment for vehicles, in combination, braking means, means for applying the brake, means for controlling the degree of application of said braking means in accordance with the rate of deceleration of the vehicle, and means for controlling the rate of release of said brakes effected by operation of said last named means in accordance with the speed of the vehicle.

31. In a brake equipment for vehicles, in combination, braking means, means for applying the braking means, retardation control means responsive to the rate of deceleration of the vehicle for limiting the rate of retardation effected by said braking means, and means responsive to the speed of the vehicle for limiting the rate of change in the retarding effects of said braking means occasioned by operation of said retardation control means.

32. In a brake equipment for vehicles, in combination, braking means, means for applying the braking means, retardation control means responsive to the rate of deceleration of the vehicle for controlling the degree of application and release of said braking means to limit the rate of retardation effected by said braking means, and means responsive to the speed of the vehicle for limiting the rate of release of said brake when made in response to the operation of said retardation control means.

33. In a brake equipment for vehicles, in combination, braking means, means for applying the braking means, retardation control means responsive to the deceleration of the vehicle for controlling the degree of application and release of said braking means to limit the rate of retardation effected by said brake, and means for predetermining the rate of making a particular release in dependence upon the speed of the vehicle to permit more rapid rates of release as the vehicle speed decreases.

34. In combination, a fluid pressure brake for vehicles, a brake valve for effecting manual control of said brake, retardation control means responsive to the deceleration of the vehicle, an application valve and a release valve controlled thereby during application of said brakes for controlling the effective braking force, and means for predetermining the rate of making a particular release in dependence upon the speed of the vehicle to permit a more rapid rate of release as the vehicle speed decreases.

35. In a brake equipment for vehicles, in combination, a brake cylinder, means for supplying fluid under pressure to said brake cylinder for applying the brakes, means controlled according to the rate of retardation of the vehicle for controlling communication through which fluid under pressure is adapted to be released from the brake cylinder, and means operative according to the speed of the vehicle for varying the rate of flow of fluid through said communication.

36. In a brake equipment for vehicles, in combination, a brake cylinder, means for supplying fluid under pressure to said brake cylinder for applying the brakes, means actuated in accordance with the rate of retardation of the vehicle for effecting communication for releasing fluid under pressure from said brake cylinder, and means responsive to the speed of the vehicle for determining the rate of fluid flow through said communication.

JOHN W. LOGAN, Jr.

CERTIFICATE OF CORRECTION.

Patent No. 2,068,339.                                              January 19, 1937.

JOHN W. LOGAN, JR.

It is hereby certified that error appears in the printed specification of the above numbered patent requiring correction as follows: Page 9, second column, line 70, claim 20, after the word "manually" insert operable; and that the said Letters Patent should be read with this correction therein that the same may conform to the record of the case in the Patent Office.

Signed and sealed this 27th day of April, A. D. 1937.

Leslie Frazer
                                          Acting Commissioner of Patents.

(Seal)